United States Patent [19]

Vinding

[11] 3,895,294

[45] July 15, 1975

[54] PHASE CHANGE MEASURING CIRCUIT

[75] Inventor: Jorgen P. Vinding, Monte Sereno, Calif.

[73] Assignee: The United States of America as represented by the Secretary of the Navy, Washington, D.C.

[22] Filed: Feb. 14, 1974

[21] Appl. No.: 442,538

[52] U.S. Cl.................. 324/83 D; 324/82; 331/1 A
[51] Int. Cl............................................ G01r 25/00
[58] Field of Search............ 324/82, 83 R, 83 D, 85; 331/1 A, 12, 136, 41, 42, 43

[56] References Cited
UNITED STATES PATENTS

| | | | |
|---|---|---|---|
| 3,160,815 | 12/1964 | Ford ..................................... | 324/82 |
| 3,386,096 | 5/1968 | Lundgreen........................ | 324/83 D |
| 3,502,977 | 3/1970 | Richman............................... | 324/82 |
| 3,600,700 | 8/1971 | Matsuo................................. | 331/12 |
| 3,789,316 | 1/1974 | Goetz.................................... | 331/12 |

Primary Examiner—Alfred E. Smith
Assistant Examiner—Michael J. Tokar
Attorney, Agent, or Firm—R. S. Sciascia; Charles D. B. Curry

[57] ABSTRACT

A device for measuring the phase change of an input signal over a specified period comprising a phase-locked tracking filter including a high frequency voltage-controlled oscillator (VCO), a frequency divider to give local oscillator signal at the same frequency as the input signal and a counter counting cycles of the VCO whose phase change in any period is N times the input phase change to allow 1/N period resolution, N being an arbitrary integer. The phase change measuring circuit thus allows phase measurement with a resolution within a small fraction of one cycle.

1 Claim, 2 Drawing Figures

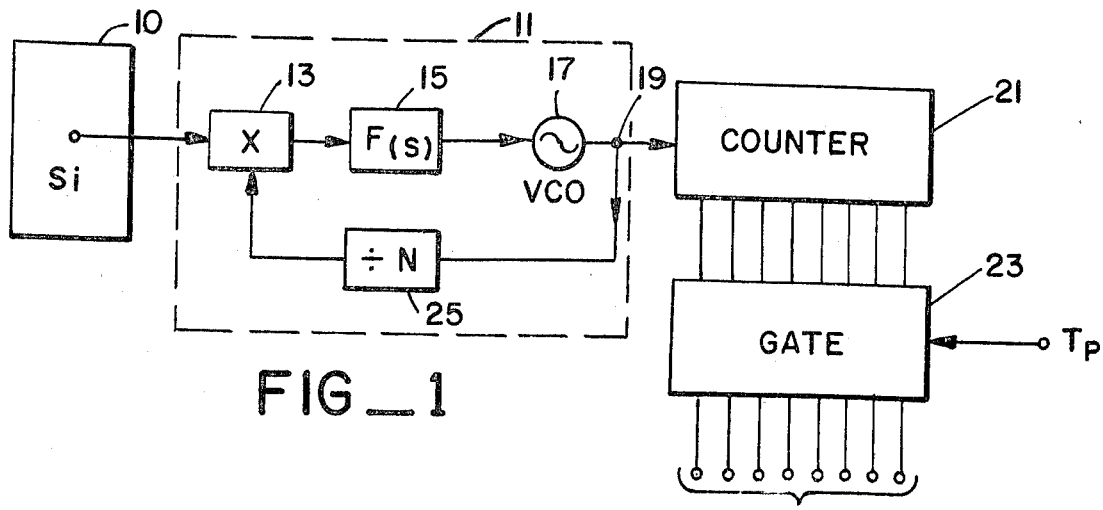
FIG_1
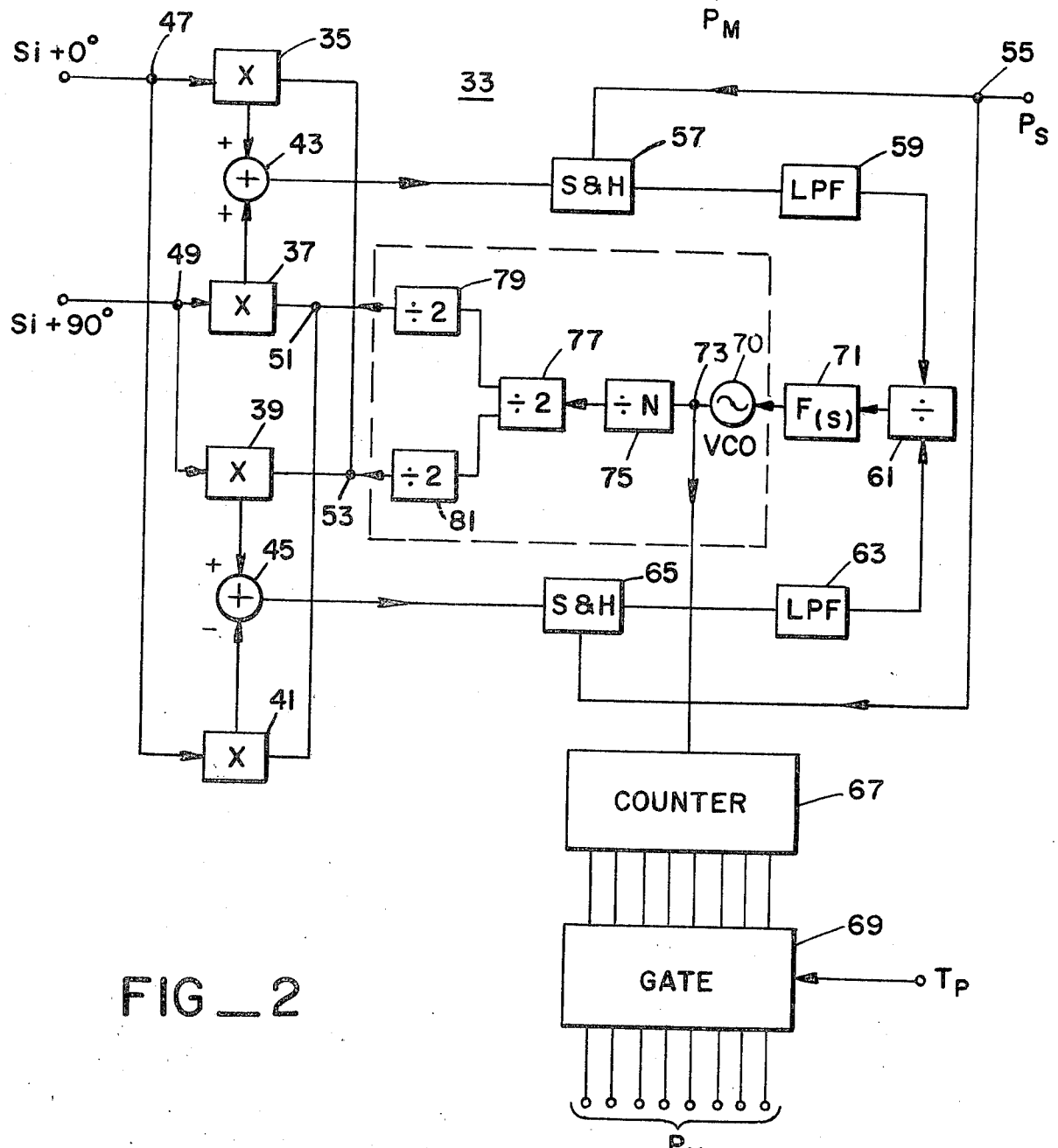
FIG_2

PHASE CHANGE MEASURING CIRCUIT

BACKGROUND OF THE INVENTION

1. Field of the Invention.

The subject matter of the present invention is generally related to phase measuring circuitry which will measure phase change over a specified period and more particularly to a phase measuring device which will monitor phase change with a resolution equal to a small fraction of one cycle.

2. Description of the Prior Art.

Prior circuitry used amplification and filtering techniques followed by circuitry which counted whole cycles for one period resolution; or alternately by counting of zero crossings for one half period resolution. Moreover, for signals of high S/N ratios, frequency multiplication techniques followed by cycle counting were used. None of the prior circuitry could resolve or measure small fractions of one cycle of weak or noisy input signals.

SUMMARY OF THE INVENTION

Briefly, the present invention is a device for measuring the phase change of an input signal over a specified period comprising a phaselocked tracking filter including a high frequency voltage-controlled oscillator (VCO), a frequency divider to give local oscillator signal at the same frequency as the input signal and a counter counting cycles of the VCO whose phase change in any period is N times the input phase change to allow 1/N period resolution, N being an arbitrary integer. The phase change measuring circuit thus allows phase measurement with a resolution within a small fraction of one cycle.

STATEMENT OF THE OBJECTS OF THE INVENTION

A primary object of the present invention is to provide a device which will measure phase change within a small fraction of one cycle.

Another object of the present invention is to provide a device which will measure phase change even for weak or noisy signals and in the presence of modulation or frequency drift of the input signal.

Other objects, advantages and novel features of the present invention will become apparent from the following detailed description of the invention when considered in conjunction with the accompanying drawings wherein:

BRIEF DESCRIPTION OF THE DRAWINGS

FIG. 1 is a schematic illustration of the basic arrangement of the phase change measuring circuit;

FIG. 2 is a schematic illustration of an improvement of the phase change measuring circuit illustrated in FIG. 1.

DESCRIPTION OF THE PREFERRED EMBODIMENT

Referring to FIG. 1, phase lock loop circuit 11, hereinafter referred to as PLL, is comprised of mixer 13, filter 15, voltage controlled oscillator (VCO) 17 and frequency divider 25. A complete description of the well known PLL circuit 11 is described in *Phaselock Techniques* by Floyd M. Gardner, pages 1, 2 and 7 through 16, published by John Wiley and Sons, Inc., New York. Counter 21 is connected through junction 19 to voltage controlled oscillator 17. Applicant claims as unique the combination of the phase lock loop circuit 11 in combination with counter 21 and gate 23 illustrated in FIG. 1. In operation, input signal $S_i$ of a frequency $F_i$ from a receiver or like device 10 is applied to mixer 13. The mixer output signal (phase error signal) is applied to filter 15. The output of filter 15 is applied to voltage controlled oscillator 17 hereinafter referred to as VCO 17. VCO 17 may be any of the known VCO circuits in which the frequency of its output may vary in response to the voltage applied to its input. The output of VCO 17 is transmitted both to counter 21 and fed back to frequency divider 25 via junction 19. The frequency divider 25 divides down the signal frequency by an integer N. In operation, the input signal $S_i$ of frequency $F_i$ is compared in phase to a local signal derived from VCO 17 by frequency division in divider 25, with an integer circuit N. The phase error signal is modified by the loop filter function $F_{(s)}$ from filter 15. The output from filter 15 is then applied to VCO 17 as a control to maintain essentially zero phase error. When such phase lock is established the frequency $F_o$ of VCO 17 is equal to $Nf_i$ and its phase change during any time interval is N times the phase change of the input signal $S_i$. Therefore, the phase change of input signal $S_i$ is measured with a resolution of $2\pi/N$ by counting cycles of the VCO 17 in counter 21. The time interval for each phase change measurement is set by timing pulses $T_p$ from a standard timing circuit. Counter 21 counts the periods of the VCO output which are displayed on the plurality of outputs in a digital format. For example, each output of counter 21 represents the output of a separate flip-flop which collectively represent the count at any instant in time. Gate 23 samples the output of counter 21 at various points in time as determined by the timing pulses $T_p$. The output $P_m$ of the gate 23 is recorded at the occurrence of each of the timing pulses $T_p$. Therefore, the difference between successive readings of $P_m$ indicates the number of periods of VCO 17 output during the interval between successive timing pulses $T_p$. From this it can be seen that the phase change of the output of the VCO 17 during each interval is 2 times the change in count between successive timing pulses $T_p$. In the above described circuit, the function of tracking filter, i.e. the PLL consisting of 13, 15, 17 and 25 and phase measurement performed by counter 21 and gate 23 are combined. The resolution can be made as fine as justified by the signal-to-noise ratio (S/N). The phase measurement output signal $P_m$ is presented in digital form from gate 23. Circuit 11 allows 1/N period resolution even for weak signals. The above described PLL for tracking filter is prior art and so is phase measurement by cycle counting. The present invention combines the two to achieve simultaneous tracking filter action and phase measurement with previously impossible resolution. A similar PLL circuit as described is shown in U.S. Pat. No. 3,393,380. A counter circuit used for phase measurement is shown in U.S. Pat. No. 2,911,641. The improvement is based on combining the two.

Referring to the improvements illustrated in FIG. 2, circuit 33 operates as follows: a two phase input signal $S_i$ one at 0° and the other at 90° comes from a receiver or some other sources. The input signal $S_i$ at 0° is applied to mixer 35 or the like and to mixer 41 or the like via junction 47. The input signal $S_i$ at 90° is applied to mixer 37 or the like and to mixer 39 or the like via junction 49. The mixing products from mixers 35 and 37 are applied to adder 43. The mixing products from mixer 39 and the inverted mixing products from mixer 41 are applied to adder 45. The outputs from adders 43 and 45 are applied to the inputs of sample and hold circuits 57 and 65 respectively. The sample and hold circuits in each feedback channel allows measurement on a sampled or pulsed input signal and would not be used if input signal $S_i$ were continuous. An equivalent sample and hold circuit, hereinafter referred to as S & H, is described in an article entitled "Stability of Sampled PLL," by F. M. Gardner, disclosed in Proc. IEEE, December 1970, pp. 1953–1954. Sample control pulses $P_s$ are applied to S & H 57 while sample control pulses $P_s$ generated from junction 55 is applied to S & H 65. The outputs from S & H's 57 and 65 are applied to low pass filters 59 and 63 respectively. The output signals from low pass filters 59 and 63 are applied to phase comparator 61 which may be implemented as a divider. The output from divider 61 is applied to VCO 70 through filter 71. The output from VCO 70 is applied to the input of N divider 75 and also to counter 67 via junction 73. The plurality of outputs from counter 67 are applied to the input of gate circuit 69 which gives the counter readout at instants established by timing pulses $T_p$. The output from gate 69 being the phase measurement signal $P_m$ for each period between successive timing pulses.

The output signal from N divider 75 is applied to ÷2 divider 77 which divides the input signal frequency in half and provides two outputs in opposite phase. One of said outputs is applied to ÷2 frequency divider 79 and the other to ÷2 frequency divider 81. Frequency dividers (÷2) 79 and 81 have outputs which differ in phase by 90°. The output from frequency divider 79 is applied as local oscillator signal to mixer 37 and to mixer 41 via junction 51. The output from frequency divider 81 is applied to mixer 35 and to mixer 39 via junction 53. The output signals from 79 and 81 act as reference signals when applied to their respective mixers (37 and 41, and 35 and 39). The use of ÷2 frequency dividers 77, 79 and 81 respectively provides local oscillator quadrature signals with excellent precision in a manner that is easily implemented by digital integrated circuits. The unique circuitry described above can be combined with the N circuits and the VCO on a single IC chip if desired. The resolution of phase change measurement is then equal to $\pi/2N$. The use of a two-phase local oscillator signal and a two-channel feedback path gives one the ability to track modulated signals with low carrier levels. The use of the two-phase input signal and local oscillator signals provides cancellation of sum terms from the mixers. Finally, the use of a divider for phase comparison between two feedback channels removes the dependence on the signal level.

It should be noted that the circuit described in FIG. 2 delivers local oscillator signals 0° and 90° phase in the form of square waves. Since a square wave contains substantial amounts of third, fifth and seventh harmonics signals as well as some higher harmonics, the circuit would be able to establish phaselock with incoming signals at each of these frequencies. The spurious responses can be eliminated by one of several methods described below. First, restrict the allowable frequency band of the incoming signal to a ratio of less than 3 between the highest and the lowest frequency. Then the third or higher harmonics of the local oscillator will never equal the frequency of an incoming signal. This method is preferred when such band limitations can be established. Second, transform the square waves into sinewaves with low distortion and hence negligible harmonic content. One way to accomplish this is to form a triangular wave of fixed amplitude from the square wave, then pass this signal through a diode network. Such waveshaping is commonly used in waveform generators, for example in the Hewlett Packard Mod 202A Function Generator. Finally, by use of signal search techniques and locic decision making to assure that phaselock with the local oscillator fundamental frequency is always established before the harmonic frequencies enter the input signal band. Once established, the fundamental frequency lock will usually not be disturbed by the existence of harmonics.

What is claimed is:

1. A device for measuring first and second input signals, one at 0° and the other at 90° over a specified time duration comprising:
   a. a phase detecting circuit consisting of first and second adders and first, second, third and fourth mixers wherein the output of which provides first and second error signals;
   b. said first error signal being applied to a first sample and hold circuit, said second error signal being applied to a second sample and hold circuit;
   c. the outputs of said first and second sample and hold circuits being applied to the respective inputs of a divide circuit;
   d. the output of said divide circuit being applied to the input of a filter circuit the output of which is applied to the control input of a voltage controlled oscillator;
   e. frequency dividing means connected to the output of said voltage controlled oscillator for generating first and second reference signals having a 90° phase difference for mixing with said first and second input signals;
   f. a counting device connected to the output of said voltage controlled oscillator;
   g. a gating circuit connected to the output of said counting device;
   h. a source of timing pulses connected to said gating circuit for actuating said gating circuit to sample the output of said counting device at the occurrence of each of said timing pulses; whereby
   i. the difference between the counts sampled at successive timing pulses is a measure of the phase change of said input signals during the interval between said successive timing pulses.

* * * * *